Patented Feb. 23, 1932

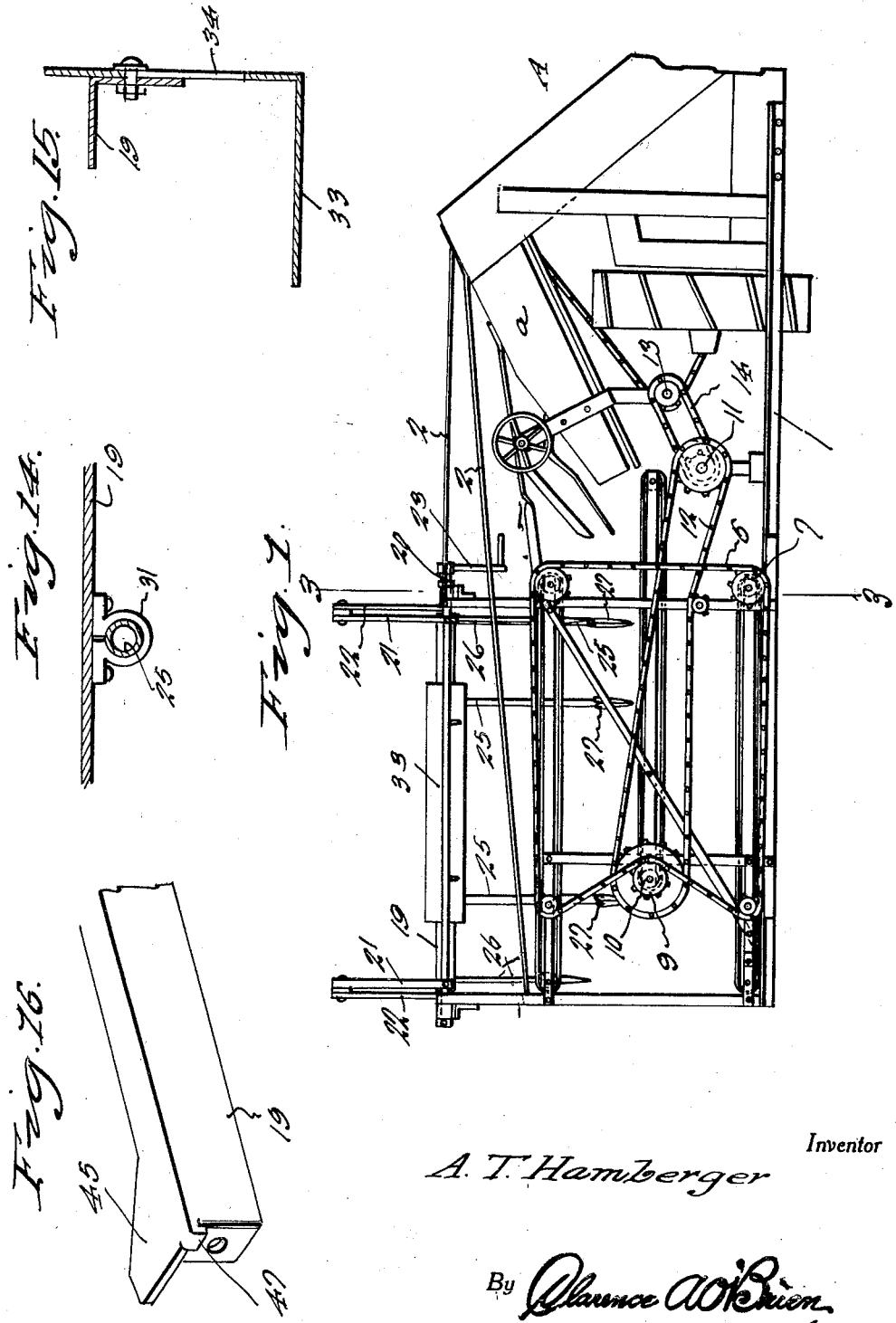

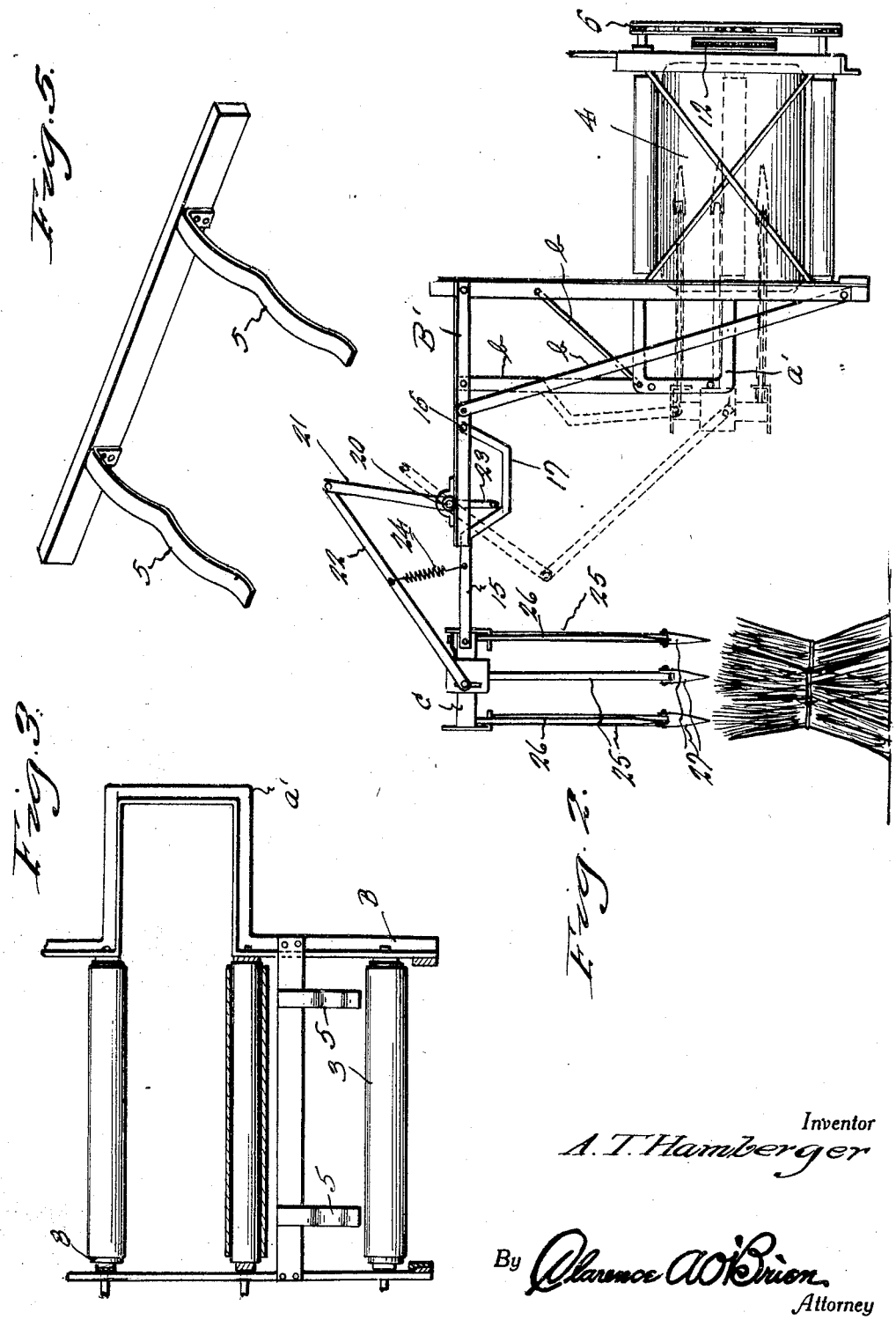

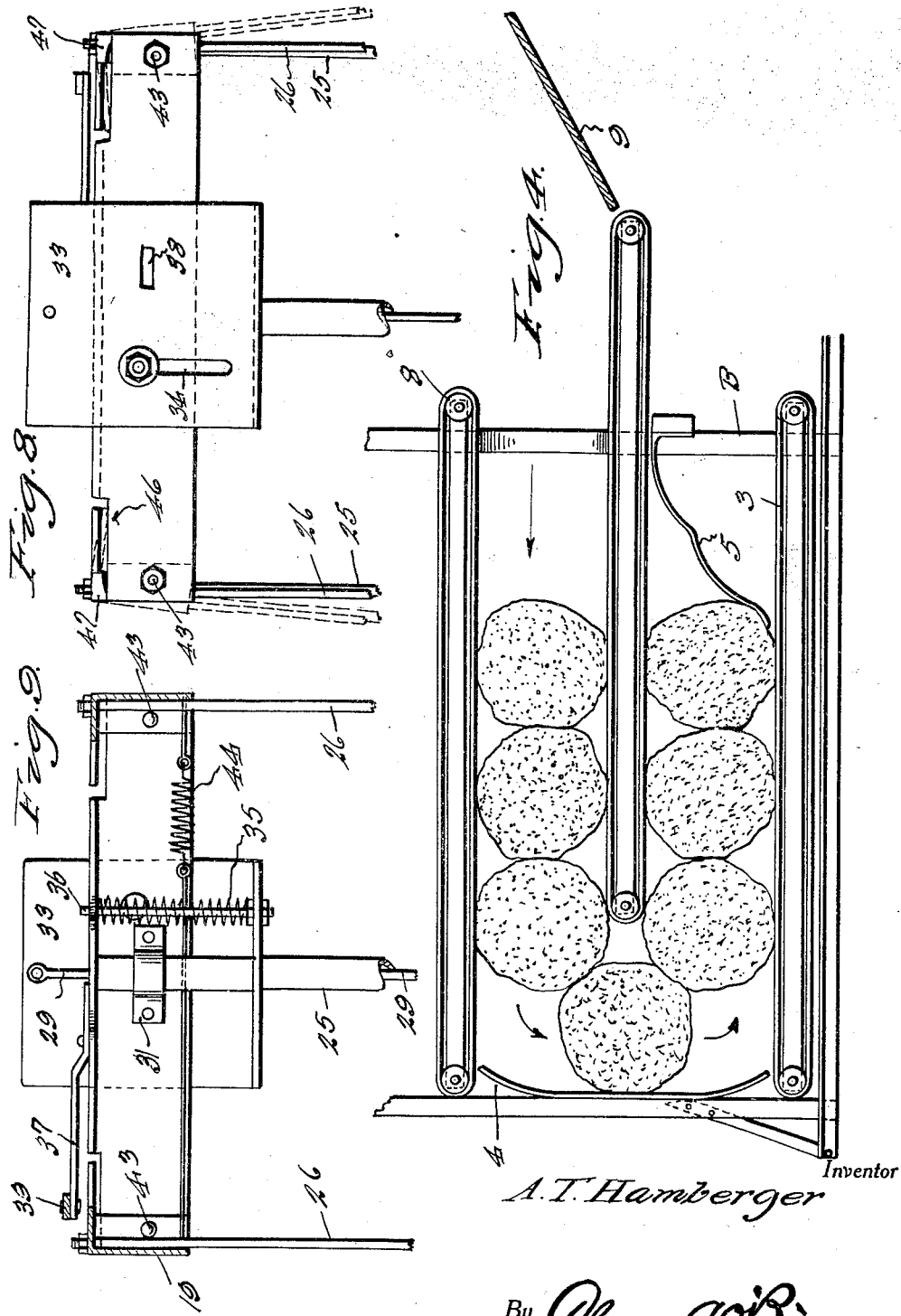

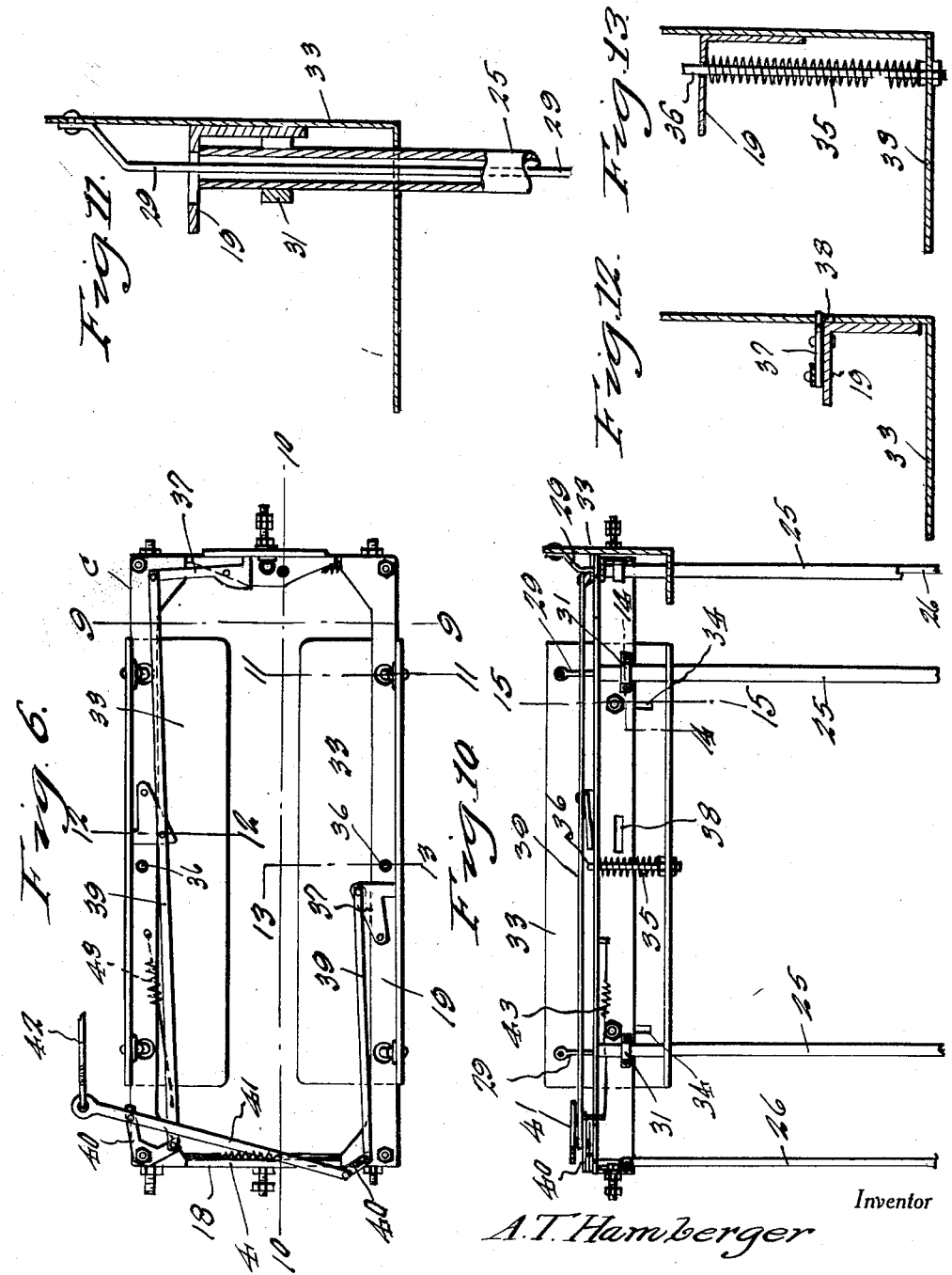

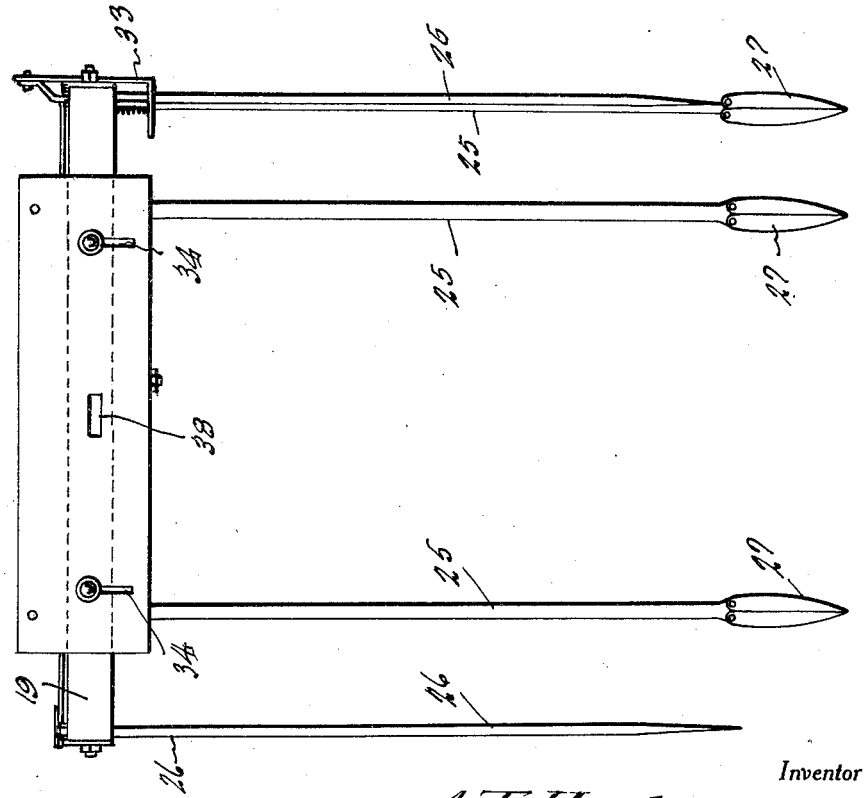
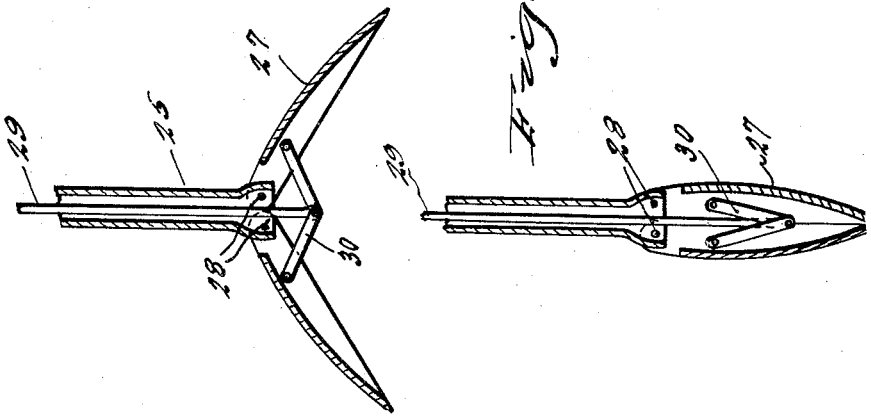

1,846,722

UNITED STATES PATENT OFFICE

ADOLPH T. HAMBERGER, OF SCOTLAND, SOUTH DAKOTA

SHOCKER ATTACHMENT FOR GRAIN BINDERS

Application filed May 20, 1931. Serial No. 538,856.

This invention relates to a shocker attachment for grain binders, the general object of the invention being to provide means for supporting a number of bundles of grain coming from the binder, with manually operated means for moving said bundles from the supporting means and deposit the same upon the ground in the form of a shock.

Another object of the invention is to so form the depositing means that the shock is formed with a wide base so that there is no danger of the shock being knocked over or blown over.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts thruout the several views, and in which:—

Figure 1 is an elevation of the attachment showing the same connected with part of a binder, at one side of the binder.

Fig. 2 is an end view showing the parts in position in full lines after they have deposited the shock and in dotted lines in the receiver or bailer.

Fig. 3 is a section on the line 3—3 of Fig. 1 and showing part of the bailer.

Fig. 4 is a view of the bailer with the bundles therein.

Fig. 5 is a perspective view of the spring stop arms for the bundles in the bailer.

Fig. 6 is a top plan view of the supporting frame and the parts associated therewith for supporting the spears.

Fig. 7 is a side view of the frame with the spears depending therefrom.

Fig. 8 is an end view of Fig. 7.

Fig. 9 is a section on the line 9—9 of Fig. 6.

Fig. 10 is a section on the line 10—10 of Fig. 6.

Fig. 11 is a section on the line 11—11 of Fig. 6.

Fig. 12 is a section on the line 12—12 of Fig. 6.

Fig. 13 is a section on the line 13—13 of Fig. 6.

Fig. 14 is a section on the line 14—14 of Fig. 10.

Fig. 15 is a section on the line 15—15 of Fig. 10.

Fig. 16 is a perspective view of a part of one of the side members of the spear supporting frame.

Fig. 17 is a sectional view through the lower part of one of the spears with the sectional point thereof in closed position.

Fig. 18 is a sectional view of the sections of the point in open position.

In these drawings, the letter A indicates a side portion of a binder, the discharge for the bundles of which is shown at $a$. A frame B is connected to the binder by the cross pieces 1 and the braces 2 and this frame supports the three endless belts 3 arranged one above the other as shown in Fig. 4, with the central belt having one end located in a position to receive the bundles from the chute $a$, and its other end spaced outwardly from the adjacent end of the upper and lower belts, so that the bundles traveling along this central belt or conveyor will pass through the space between its inner end and the guide member 4 at the outer end of the frame B upon the lower belt or conveyor, which moves the same towards the binder end of the bailer until the spring fingers 5 are struck at this end of the frame. Thus the bundles assume substantially the position shown in Fig. 4, which shows the bundles ready to be removed from the bailer to form the shocks.

These belts or conveyors are actuated by the endless chain 6 passing over sprockets 7 connected with the rollers 8 thereof, this chain passing over a sprocket 9 on a shaft 10 journaled in the frame B and which is driven from a shaft 11 supported on the lower cross pieces 1, by the chain and sprocket generally shown at 12. The shaft 11 is driven from a shaft 13 of the binder by the chain and sprocket shown generally at 14.

The bundles are deposited in the bailer with their butts extending forwardly and their tops extending rearwardly, and that part of the frame B adjacent the binder has an offset part a' for permitting the bundles to enter the space between the central and top belts without interference from the front part of the frame as shown in Fig. 3. The rear part of frame B has a horizontal extension B' which is braced as shown at b and a pair of bars 15 have their front or inner ends pivoted to this extension frame as shown at 16. The rear part of each bar 15 is provided with an offset part as shown at 17.

The frame C composed of the end pieces 18 and the side pieces 19 has its ends connected to the outer ends of the bars 15. A shaft 20 is journaled in the extension frame B' and has the arms 21 attached thereto and these arms are connected by the links 22 to the frame C' at the ends thereof so that by rocking the shaft 20 such as by means of the crank 23, and suitable connections to the points where the operator stands the frame can be moved from the full line position shown in Fig. 2, to the dotted line position shown in said figure and vice versa.

A spring 24 connects the link 22 with the bar 15 for counter-balancing the weight of the parts.

A plurality of spears or harpoon forks 25 are supported by the frame C and a number of pointed rods 26 are also carried by the frame, these spears and pointed rods depending from the frame when the frame is in horizontal position, as shown in full lines in Fig. 2, for entering the bailer when the frame is swung downwardly into the dotted line position shown in Fig. 2, whereby the spears and pointed rods will engage the bundles in the bailer.

Each spear or harpoon fork has a tubular stem with a sectional point at its lower end, the sections 27 of which are pivoted to the lower end of the stem as shown at 28, and a rod 29 passes through the stem and is connected to the sections by the links 30 so that when the rod is pulled upon the sections move apart as shown in Fig. 18, but when the sections are in closed position as shown in Fig. 17 to form a point so that the spear or harpoon can enter a bundle. The upper ends of the spears or harpoons are connected to the frame C by the brackets 31 as shown in Fig. 14, and the upper ends of the rods 29 are connected to the angle plates 32, one of which is arranged at each side of the frame, and one at one side thereof as is clearly shown in Figs. 6 and 7, 8, 9 and 10.

Each of the plates 33 is supported for sliding movement on the frame C by the pin and slot connection shown generally at 34 and said plate is normally held with the pin at the upper end of the slot, by the springs 35 arranged on the rods 36 which are carried by the plates and pass through the guiding openings in the frame. These plates are so arranged, that their horizontal flanges will engage the front bundles when the frame is swung downwardly to cause the spears or harpoons to enter the bundles so that the ends of the bundles pressing against the spears or rather the plates pressing against the bundles will cause said plates to move outwardly, thus exerting a pull on the rods 29 which pass through the spears or harpoons so as to cause the sections of the points to open to the position shown in Fig. 18, thereby pulling the bundles from the bailer as the frame C is moved outwardly and upwardly to the horizontal position shown in full lines in Fig. 2.

As the plates 33 are moved by contact with the ends of the bundles, lock members 37 will engage slots 38 formed in the plates to hold them in position with the sectional points of the spears in open position so that said sections will not close under the weight of the bundles as the frame is swung upwardly to a horizontal position.

The lock members 37 are connected by the links 39 with the bell cranks 40 on the frame C and these bell cranks are connected to a bar 41 to which a cable 42 is connected which leads to a point adjacent the operator, so that by pulling upon the cable, the bar 41 is moved to a position to rock the bell crank which causes the links 39 to move to the lock members 37 out of the slots 38 and then the plates will return to their normal position and through the action of the springs 35, and the weight of the bundles on the open sections of the points of the spears so that the bundles will be deposited upon the ground in the form of the stack as shown in Fig. 2. A spring 43 holds the parts in a position with the latch members tending to move outwardly in engagement with the slots 38 so that as soon as the plates 33 move upwardly, the latch members will engage the slots.

The side members 19 of the frame C are pivotally connected to the end members as shown at 43 and rods and springs shown generally at 44, particularly in Fig. 9, tends to hold the side members in a straight position but permits them to swing outwardly as shown in dotted lines in Fig. 8. Each end of each side member has a projecting part 45 thereon as shown in Fig. 16, which will engage the wall of the cut-out portion 46 at each end of each end member to limit the outward movement of the side member as shown in Fig. 8 and in dotted lines, and each end of each side member is provided with a projection 47 which is a part of said wall 46. Thus the described arrangement of the parts will allow the harpoons or the spears to spread out at their lower ends when the shock is placed upon the ground which gives the shock a larger base and consequently the shock will not tumble over so easily.

When the spears are pulled from the shock, the spring means 44 will pull these parts back into position so that the harpoons or spears will be in parallel position ready to enter the bailer when the frame C is swung downwardly again.

From the foregoing it will be seen that I provided means whereby an operator can remove the bundles of grain from the bailer when such bundles have collected therein to form a shock and to deposit these bundles on the ground in the form of a shock having a wide base.

It is thought from the foregoing description that the advantages and novel features of the invention will be readily apparent.

It is to be understood that changes may be made in the construction and in the combination and arrangement of the several parts, provided that such changes fall within the scope of the appended claims.

Having thus described my invention, what I claim as new is:—

1. A shocker attachment for binders comprising a frame attached to the binder, means for receiving and holding bundles of grain falling from the binder, and manually operated means for removing the bundles from the said means and depositing same upon the ground in the form of a shock, such means including a frame supported for swinging movement, a plurality of pointed members carried by the frame and penetrating the bundles when the frame is swung downwardly and inwardly, whereby the bundles are removed from the collecting means when the frame is swung upwardly, and manually operated means for releasing the bundles in the form of a shock from the pointed members.

2. A shocker attachment for binders comprising a frame, means in the frame for receiving the bundles of grain from the binders and supporting the bundles in close relation, a frame supported for swinging movement from the first frame, a plurality of pointed members carried by the second frame and having their points formed of movable sections, said pointed members penetrating the bundles when the frame is swung downwardly and inwardly, means for causing the sections of the points to open when the frame strikes the bundles whereby the bundles will be removed with the pointed members when the frame is swung upwardly, and manually operated means for causing the sectional points to close to release the bundles in the form of shocks.

3. A shocker attachment for binders comprising a frame, means in the frame for receiving the bundles of grain from the binders and supporting the bundles in close relation, a frame supported for swinging movement from the first frame, a plurality of pointed members carried by the second frame and having their points formed of movable sections, said pointed members penetrating the bundles when the frame is swung downwardly and inwardly, means for causing the sections of the points to open when the frame strikes the bundles whereby the bundles will be removed with the pointed members when the frame is swung upwardly, and manually operated means for causing the sectional points to close to release the bundles in the form of shocks, and means whereby the pointed members will move apart to spread the lower end of the shock to provide a wide base therefor.

4. An attachment for binders comprising a frame, conveyor means therein for receiving the bundles of grain, from the binder in close relationship, a second frame supported for swinging movement in the first frame, a plurality of pointed members carried by the second frame, some of said members having sectional points hinged thereto, said pointed members penetrating the bundles when the second frame is swung downwardly and inwardly, means operated by the second frame striking the bundles for opening the hinged sections of the points to cause the bundles to be removed with the pointed members when the frame is swung outwardly and upwardly, lock means for holding the parts with the hinged sections of the points in open position, and manually operated means for releasing the latch means to permit the section points to close to release the bundles in the form of shocks.

In testimony whereof I affix my signature.

ADOLPH T. HAMBERGER.